3,300,341
FUEL CELL HEAT AND WATER REMOVAL SYSTEM USING ELECTROLYTE CIRCULATION
John W. Gregory, Parma Heights, Charles W. Fetheroff, Willowick, and John M. Fuscoe, Cleveland, Ohio, assignors to TRW Inc., a corporation of Ohio
Filed June 22, 1962, Ser. No. 204,437
7 Claims. (Cl. 136—86)

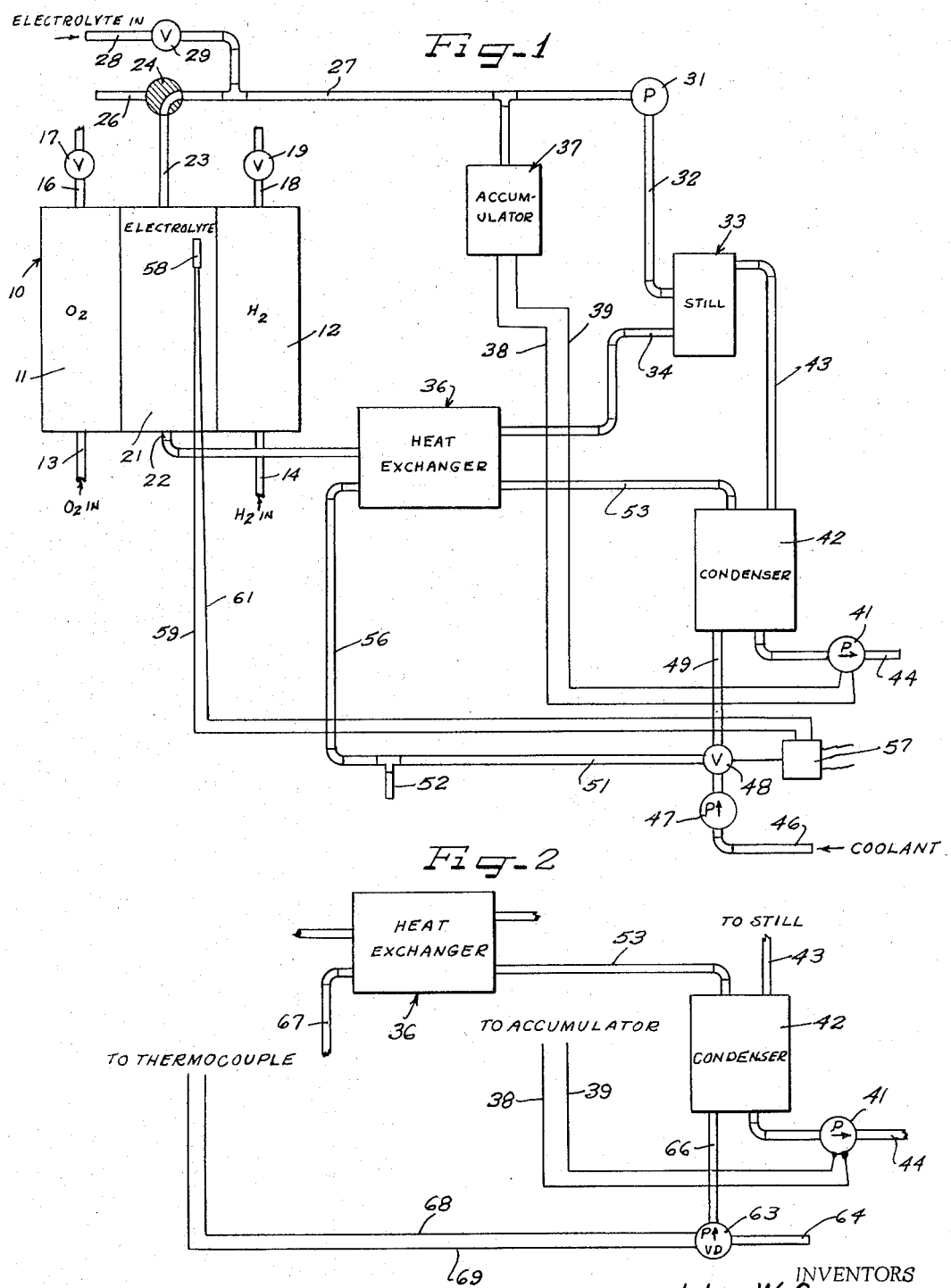

The present invention is directed to an improved fuel cell assembly which is compensated for variations in electrolyte concentration and electrolyte temperature which occur during operation of the cell.

In any fuel cell using a liquid electrolyte, whether the fuel gas be hydrogen, hydrocarbon gases or other combustible gases, prolonged operation of the cell results in dilution of the electrolyte by the water produced as a result of the fuel cell reaction. Then, too, variations in temperature are frequently encountered in any fuel cell system and these changes in temperature must be controlled to within reasonably narrow limits if optimum operating conditions are to be maintained. The variation of electrolyte concentration and variations in temperature combine to affect the operation of the fuel cell through a combination of factors, including changes in the conductivity of the electrolyte, changes in the vapor pressure of the electrolyte, changes in the free energy of the reactants, and changes in the rate of reaction, all of which ultimately would result in a change in the voltage output of the fuel cell.

In the past, various means have been employed in attempts to remove water before the concentration of water is sufficient to affect the electrolyte concentration significantly, and also to control the temperature within the cell. Such means have not always been universally satisfactory, since they frequently involved the use of heavy equipment of large volume, and in some cases, required substantial accessory power for their operation.

One of the principal objects of the present invention is to provide an automatic compensating system for detecting and correcting changes in electrolyte concentration due to dilution of the electrolyte by water.

A further object of the present invention is to provide a fuel cell system with a closed recirculating system for the electrolyte, and containing automatic compensating means actuated by changes in concentration of the electrolyte.

A further object of the invention is to provide a fuel cell assembly including temperature sensing means which, together with the concentration sensing means, provides a continuous and automatic control of electrolyte temperature and concentration.

Other objects and features of the present invention will be apparent to those skilled in the art of the following detailed description of the accompanying drawings in which:

FIGURE 1 is a somewhat schematic view of a fuel cell assembly according to the present invention; and FIGURE 2 illustrates a modified form of the assembly shown in FIGURE 1.

As shown in the drawings:

In FIGURE 1, reference numeral 10 indicates generally a fuel cell assembly of the type employing two or more electrodes, a fuel gas, an oxidizing gas, and a liquid electrolyte. The specific details of construction of the fuel cell form no part of this invention, nor do the specific reactants since the invention is applicable to all fuel cells of the type described. For convenience, the invention will be described in conjunction with a typical oxygen-hydrogen fuel cell employing a concentrated solution of potassium hydroxide as the electrolyte. The oxygen zone has been generally indicated at numeral 11 in the drawings, and the hydrogen zone at numeral 12. It should be appreciated, of course, that a typical fuel cell assembly will consist of an array of oxygen and hydrogen electrodes with a manifolding arrangement for introducing oxygen gas at the surface of the oxygen electrodes, and hydrogen gas at the surface of the hydrogen electrodes. The inlet for oxygen to the fuel cell 10 has therefore been illustrated generally at numeral 13, and the inlet for hydrogen at reference numeral 14 in FIGURE 1. Since it is frequently convenient and sometimes necessary to purge gases from the fuel cell, an outlet conduit 16 controlled by a valve 17 is provided for purging oxygen gas, and an outlet conduit 18 controlled by a valve 19 is provided for purging hydrogen gas.

The electrolyte chamber has been broadly designated at numeral 21 in FIGURE 1. In accordance with the present invention, we employ a circulating electrolyte system including an inlet conduit 22 for introducing the concentrated electrolyte solution into the fuel cell 10, and an outlet conduit 23 for discharging electrolyte from the cell. A three-way valve 24 selectively directs the discharge from the discharge conduit 23 either to a drain 26 or to a conduit 27 for circulation through the system. Fresh electrolyte is added to the system initially through an inlet conduit 28 controlled by a valve 29.

The electrolyte is circulated through the fuel cell 10 continuously by the action of a pump 31 which is connected to the conduit 27 and which has a discharge line 32 feeding a vapor-liquid separator such as the still 33. Liquid electrolyte is withdrawn from the still 33 through a conduit 34 and passes into a heat exchanger 36 where the temperature of the electrolyte is adjusted, as required, for optimum operating conditions.

From FIGURE 1, it will be seen that the fuel cell 10, the still 33, and the heat exchanger 36 form a constant volume closed circulating system for the liquid electrolyte. When, however, the fuel cell has been in operation for some time and significant amounts of water have accumulated in the electrolyte and have thereby diluted the electrolyte, this condition will be sensed, in the form of the invention illustrated in FIGURE 1, by an accumulator 37. The latter may consist, for example, of an expanding bellows type sensing mechanism, together with an electrical sensor which provides a signal when the bellows have expanded beyond a predetermined level. This signal is passed by means of electrical leads 38 and 39 to control the operation of a pump 41. The pump 41 serves to control the discharge from a condenser 42 which is connected to the vapor space of the still 33 by means of a conduit 43. Accordingly, when the accumulator 37 senses the existence of excessive amounts of water, the operation of the pump 41 is modified to withdraw larger amounts of vapor from the still 33 to be condensed in the condenser 42 and thereupon discharged through a drain 44.

While an accumulator 37 is shown in FIGURE 1 as the means for sensing concentration changes in the electrolyte, it should be evident that other concentration sensors can also be employed. For example, an electrical sensor operated by changes in pH can also be employed to provide the control signal to the pump 41 upon changes in concentration in the electrolyte.

The system shown in FIGURE 1 is particularly designed for use in applications, such as marine applications, where a large amount of coolant (sea water, for example) is readily available. The coolant is introduced through an inlet line 46 and is pumped by means of a pump 47 through a flow dividing valve 48 which selectively directs the coolant, in varying proportions, to a conduit 49 which feeds the condenser 42, or to a conduit 51 which is directed to a drain 52. The coolant passing through the conduit 49 thereupon passes into heat exchange relationship with the vapors being withdrawn from the still 33 through the conduit 43, and condenses the same so that the condensed water may be discharged by the pump 41 through the discharge line 44. After the heat exchange, the coolant is passed by means of a conduit 53 through the heat exchanger 36 where it is in heat exchange relationship with the liquid electrolyte withdrawn from the still 33 through the conduit 34 and ultimately returned into the fuel cell through the inlet conduit 22. Finally, the coolant is discharged through the drain 52 by means of a conduit 56 at the exit end of the heat exchanger 36.

The flow dividing valve 48 is under the control of an electrically operated valve control mechanism 57. A thermocouple 58 senses the temperature of the electrolyte in the fuel cell 10 and transmits changes in temperature as changes in electrical current through conductors 59 and 61 to the valve control mechanism 57. Accordingly, as the temperature of the electrolyte tends to vary, greater or lesser amounts of the coolant are passed through the condenser 42 and the heat exchanger 36, depending upon the setting of the flow divider valve 48.

Instead of the flow divider valve assembly illustrated in FIGURE 1, we can use a cooling system of the type shown in FIGURE 2. The other elements of the fuel cell assembly are substantially identical to those shown in FIGURE 1, but instead of the flow divider valve 48 and its associated control mechanism 57, this form of the invention uses a variable discharge pump 63. Coolant is introduced into the pump 63 by means of an inlet line 64 and is discharged from the pump 63 by a line 66 into the condenser 42. After heat exchange with the vapors from the still 33, entering the condenser 42 through the conduit 43, the coolant passes through the conduit 53 and into the heat exchanger 36 where it is subjected to heat exchange with the electrolyte recovery from the still 33 as in the system shown in FIGURE 1. Finally, the coolant is discharged through a drain 67 or is recycled for further use. The variable discharge pump 63 is under the control of the thermocouple 58 located in the cell 10, the signal from the thermocouple 58 being delivered to the pump 63 by means of conductors 68 and 69.

From the foregoing, it will be seen that the fuel system assembly of the present invention provides automatic heat control and water removal from fuel cell assemblies. A system of the present invention is characterized by low weight, small volume, and use of only a low amount of accessory power.

It should be evident that various modifications can be made to the described embodiment without departing from the scope of the present invention.

We claim as our invention:

1. A fuel cell assembly comprising a fuel cell including electrodes, an inlet for a fuel gas and an inlet for an oxidizing gas, inlet means for introducing a liquid electrolyte into said fuel cell, outlet means for withdrawing electrolyte from said fuel cell, pump means for continuously passing electrolyte from said inlet means through said fuel cell and into said outlet means, a vapor-liquid separator receiving electrolyte from said fuel cell, said fuel cell, inlet means, outlet means, pump means, and vapor-liquid separator forming a closed loop for the circulation of electrolyte therethrough and a sensing means responsive to dilution of said electrolyte in said closed loop and controlling the operation of said vapor-liquid separator to remove excess water vapor which would tend to dilute the concentration of the circulating electrolyte.

2. A fuel cell assembly comprising a fuel cell including electrodes, an inlet for a fuel gas and an inlet for an oxidizing gas, inlet means for introducing a liquid electrolyte into said fuel cell, outlet means for withdrawing electrolyte from said fuel cell, pump means for continuously passing electrolyte from said inlet means through said fuel cell and into said outlet means, distillation means receiving electrolyte from said fuel cell, said fuel cell, inlet means, outlet means, pump means, and distillation means forming a closed loop for the circulation of electrolyte therethrough, and a sensing means responsive to dilution of said electrolyte in said closed loop and controlling the operation of said distillation means to remove excess water vapor which would tend to dilute the concentration of the circulating electrolyte.

3. A fuel cell assembly comprising a fuel cell including electrodes, an inlet for a fuel gas and an inlet for an oxidizing gas, inlet means for introducing a liquid electrolyte into said fuel cell, outlet means for withdrawing electrolyte from said fuel cell, pump means for continuously passing electrolyte from said inlet means through said fuel cell and into said outlet means, a vapor-liquid separator receiving electrolyte from said fuel cell, heat exchange means connected to receive the liquid from said separator, said fuel cell, said separator, and said heat exchange means constituting a constant volume system for the circulating electrolyte, an accumulator in fluid communication with said constant volume system to detect changes in volume in the electrolyte being circulated, and means connecting said accumulator to said separator to draw off excess water vapor from said separator when the volume of circulating electrolyte exceeds a predetermined value.

4. A fuel cell assembly comprising a fuel cell including electrodes, an inlet for a fuel gas and an inlet for an oxidizing gas, inlet means for introducing a liquid electrolyte into said fuel cell, outlet means for withdrawing electrolyte from said fuel cell, first pump means for continuously passing electrolyte from said inlet means through said fuel cell and into said outlet means, a vapor-liquid separator receiving electrolyte from said fuel cell, said fuel cell, inlet means, outlet means, first pump means, and said vapor-liquid separator constituting a closed loop for the circulation of electrolyte, an accumulator in fluid communication with said closed loop, a condenser connected to said separator to draw off water vapor therefrom, a second pump means controlling the amount of vapor drawn from said separator into said condenser, heat exchange means connected to receive the liquid from said separator, means for circulating a coolant serially through said condenser and said heat exchanger, and means interconnecting said accumulator with said second pump means to control the amount of water vapor withdrawn in response to the actuation of said accumulator.

5. A fuel cell assembly comprising a fuel cell including electrodes, an inlet for a fuel gas and an inlet for an oxidizing gas, inlet means for introducing a liquid electrolyte into said fuel cell, outlet means for withdrawing electrolyte from said fuel cell, first pump means for continuously passing electrolyte from said inlet means through said fuel cell and into said outlet means, a vapor-liquid separator receiving the discharge of said first pump, a condenser connected to said separator to condense water vapor therefrom, second pump means controlling the amount of condensed vapor withdrawn from said condenser, a heat exchanger receiving the liquid from said separator and arranged to discharge electrolyte into said fuel cell, said fuel cell, said separator, and said heat exchanger constituting a closed circuit for circulation of said electrolyte, a concentration sensing means in fluid communication with said closed circuit, means connecting said concentration sensing means to said second pump means to control the operation thereof, means for circulating a coolant through said condenser and said heat exchanger, and temperature sensing means responsive to the temperature of said electrolyte controlling the amount of coolant so circulated in response to variations in the temperature of said electrolyte.

6. A fuel cell assembly comprising a fuel cell including electrodes, an inlet for a fuel gas and an inlet for an oxidizing gas, inlet means for introducing a liquid electrolyte into said fuel cell, outlet means for withdrawing electrolyte from said fuel cell, first pump means for continuously passing electrolyte from said inlet means through said fuel cell and into said outlet means, a vapor-liquid separator receiving the discharge of said first pump means, a condenser connected to said separator to condense water vapor therefrom, a second pump means controlling the amount of condensed vapor withdrawn from said condenser, a heat exchanger receiving the liquid from said separator and arranged to discharge electrolyte into said fuel cell, said fuel cell, said separator, and said heat exchanger constituting a closed circuit for circulation of said electrolyte, an accumulator in fluid communication with said closed circuit for detecting changes in volume of said electrolyte, means connecting said accumulator to said second pump means to control the operation thereof, means for circulating a coolant through said condenser and said heat exchanger, and temperature sensing means responsive to the temperature of said electrolyte controlling the amount of coolant so circulated in response to variations in the temperature of said electrolyte.

7. A fuel cell assembly comprising a fuel cell including electrodes, an inlet for a fuel gas and an inlet for an oxidizing gas, inlet means for introducing a liquid electrolyte into said fuel cell, and outlet means for withdrawing electrolyte from said fuel cell, first pump means for continuously passing electrolyte from said inlet means through said fuel cell and into said outlet means, a vapor-liquid separator receiving the discharge of said first pump means, a condenser connected to said separator to condense water vapor therefrom, second pump means controlling the amount of condensed vapor withdrawn from said condenser, a heat exchanger receiving liquid from said separator and arranged to discharge electrolyte into said fuel cell, said fuel cell, said separator, and said heat exchanger constituting a closed circuit for circulation of said electrolyte, a concentration sensing means in fluid communication with said closed circuit, means connecting said concentration sensing means to said second pump means to control the operation thereof, means for circulating a coolant through said condenser and said heat exchanger, temperature sensing means responsive to the temperature of said electrolyte, and a variable discharge pump controlled by said temperature responsive means to vary the amount of coolant circulated through said heat exchanger.

References Cited by the Examiner

UNITED STATES PATENTS

| | | | |
|---|---|---|---|
| 2,384,463 | 9/1945 | Gunn et al. | 136—86 |
| 2,921,110 | 1/1960 | Crowley et al. | 136—86 |
| 3,002,039 | 9/1961 | Bacon | 136—86 |
| 3,080,442 | 3/1963 | Hobert | 136—86 |

WINSTON A. DOUGLAS, *Primary Examiner.*

JOHN R. SPECK, *Examiner.*

H. FEELEY, *Assistant Examiner.*